J. W. FEES.
Harrow and Weed Cutter.
No. 202,098. Patented April 9, 1878.
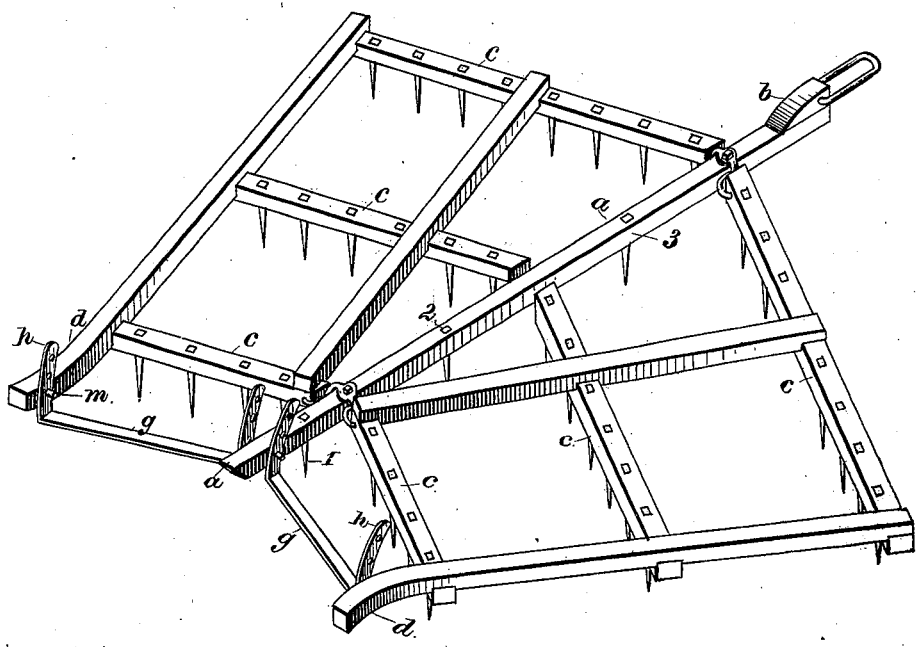
Attest.
Nathaniel Chubb.
Geo. A. Morse
Inventor.
Jacob. W. Fees.

UNITED STATES PATENT OFFICE.

JACOB W. FEES, OF CORNING, IOWA, ASSIGNOR OF ONE-HALF HIS RIGHT TO GEORGE A. MORSE, OF SAME PLACE.

IMPROVEMENT IN HARROW AND WEED-CUTTER.

Specification forming part of Letters Patent No. 202,098, dated April 9, 1878; application filed April 16, 1877.

*To all whom it may concern:*

Be it known that I, JACOB W. FEES, of Corning, in the county of Adams and State of Iowa, have invented a Combined Harrow and Weed-Cutter, of which the following is a specification:

The object of my invention is to provide a harrow specially adapted for uneven as well as even ground, and for cutting weeds at the same time that it is stirring and pulverizing the ground.

It consists in forming, arranging, and combining a central straight-toothed beam, two diagonal wings, and two horizontal and adjustable weed-cutting blades, all as hereinafter set forth.

The drawing is a perspective view illustrating the construction and operation of my complete invention.

$a\ a$ is a straight wooden beam, having a series of harrow-teeth, 1 2 3. $b$ is a triangular block, fixed on its front end and upper side, to receive a clevis and to support a drag-bar or double-tree, to which horses can be attached. $c\ c$ represent mating diagonal harrow-frames and wings, each composed of three or more teeth-bearing bars, hinged or linked to the side of the central beam $a\ a$ in any suitable way. $d\ d$ are outwardly-inclined rear extensions, projecting from the rear and outside corners of the hinged harrow-wings $c\ c$. They may be formed integral with the diagonal frames, or rigidly attached thereto by means of bolts, or in any suitable way.

$g\ g$ represent my weed-cutting blades. They are simply straight metal bars, having a sharp cutting-edge on their front side, and each end bent upward at right angles and perforated to form handles $h$, as a means of attaching and operating them in combination with the harrow. They are secured and suspended to the rear end of the central beam $a\ a$ and the wing-extensions $d$ by means of pivotal bolts or pins $m$, in such a manner that they will be in oblique positions relative to the central beam $a\ a$, and in diverse directions relative to each other.

In the practical operation of my invention, when it is dragged across a field the central beam $a\ a$, having a series of teeth, 1 2 3, will at all times, on even or uneven surfaces, engage the ground with some or all of its teeth, and thereby aid in keeping the complete harrow in a direct line with the draft, and prevent the zigzag and jumping movements incident to the operation of drag-harrows.

In advancing on a ridge or in a furrow the central beam $a\ a$ will rise or fall, as required, to accommodate itself to the situation, and the hinged diagonal wings $c\ c$ will incline up or down to conform with the surface, and thus all parts of the harrow will automatically adjust themselves relative to each other and the surface over which they are jointly passing to engage, stir, loosen, and pulverize all the surface-soil in the line of advance; consequently no area is traversed without touching and working the ground, as frequently occurs in the use of rigid and jumping harrows.

At the same time that the teeth are operated by the advance movement of the harrow the suspended cutting-blades $g$, in rear of the teeth, will drag and scrape in the loosened soil, and also the hard soil that may have escaped the action of the teeth, and with a continuous draw-cut sever the roots of all the weeds met in their line of advance, and thus destroy the weeds and grass, and clean and cultivate the field thoroughly. These cutting-blades $g$ also at the same time cut and crush lumps and clods, and further reduce and pulverize the soil lying in their track, and thus co-operate with the harrow-teeth in performing the work contemplated by the operation of a drag-harrow.

I am aware that diagonal harrow-wings have been hinged together; but I claim that my manner of combining wings with a central beam having a series of teeth is novel and greatly advantageous. I am also aware that cutters have been applied to cultivators and plows; but I claim that my manner of forming and applying an adjustable and dragging weed-cutter to a drag-harrow to produce a continuous draw-cut as the harrow advances is novel and greatly advantageous.

I claim as my invention—

1. The central straight beam $a\ a$, having the drag-bar carrier $b$ and a series of teeth, 1 2 3, the diagonal hinged harrow-wings $c\ c$, having rear extensions $d\ d$, and the horizontal cutting-blades $g\ g$, arranged and combined to operate substantially as and for the purposes shown and described.

2. In a drag-harrow, the weed-cutting blades $g$, having perforated handles $h$, pivoted to the rigid harrow-frame, to vibrate and drag in the soil in an oblique position relative to the line of advance, substantially as and for the purposes shown and described.

JACOB W. FEES.

Witnesses:
WILLIAM C. CHUBB,
GEO. A. MORSE.